United States Patent
Duffer et al.

(10) Patent No.: US 6,398,119 B1
(45) Date of Patent: Jun. 4, 2002

(54) THERMALLY CONTROLLED VALVE AND FUEL SYSTEM USING SAME

(75) Inventors: Bradly G. Duffer, East Peoria; Daniel L. Loer, Brimfield; Jeffrey J. Mueller, Normal, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/745,022

(22) Filed: Dec. 20, 2000

(51) Int. Cl.[7] ................................................ G05D 23/00
(52) U.S. Cl. ...................... 236/93 A; 236/345
(58) Field of Search .................... 123/41.08, 41.1; 236/93 A, 34.5

(56) References Cited

U.S. PATENT DOCUMENTS

| | | | | |
|---|---|---|---|---|
| 4,299,354 A | * | 11/1981 | Ketley | 236/93 A |
| 4,398,662 A | * | 8/1983 | Costello | 236/93 A |
| 4,560,104 A | * | 12/1985 | Nagumo et al. | 236/34.5 |
| 4,674,679 A | * | 6/1987 | Saur | 236/34.5 |
| 4,744,336 A | * | 5/1988 | Miller | 123/41.08 |
| 5,215,065 A | * | 6/1993 | Snyder | 236/93 A |
| 5,738,276 A | * | 4/1998 | Saur | 236/92 C |
| 5,794,598 A | | 8/1998 | Janik et al. | |
| 5,799,625 A | * | 9/1998 | Ziolek et al. | 123/41.1 |
| 5,813,601 A | * | 9/1998 | Priest et al. | 236/93 A |
| 5,826,790 A | * | 10/1998 | Raether et al. | 236/93 A |
| 6,065,682 A | * | 5/2000 | Frunzetti | 236/12.15 |

* cited by examiner

*Primary Examiner*—William E. Tapolcai
*Assistant Examiner*—Mohammad M Ali
(74) *Attorney, Agent, or Firm*—Liell & McNeil

(57) ABSTRACT

A dual temperature valve positioned in a bypass passageway can move to an open position when two temperature conditions are met. When opened, the dual temperature valve can allow warm fluid from a first line to mix with cold fluid from a second line to heat the same. The valve is preferably utilized in an engine fuel system and positioned in a bypass passageway extending between a fuel supply line and a fuel return line. In this application, the dual temperature valve can prevent possible fuel transfer problems, such as cold start gaseous circulation.

18 Claims, 3 Drawing Sheets

Fig_2_

THERMALLY CONTROLLED VALVE AND FUEL SYSTEM USING SAME

TECHNICAL FIELD

This invention relates generally to dual temperature actuated valves, and more particularly to fuel systems utilizing dual temperature actuated valves.

BACKGROUND ART

One property of diesel fuel that can be altered by refining is the temperature at which paraffins will precipitate. The temperature at which this precipitation occurs is referred to as the "cloud point" of the fuel, and is often varied by distillers depending upon the geographic region in which the fuel is intended for use. For instance, fuel that is intended for use in colder climates will typically have a lower cloud point than fuel intended for use in warmer regions. Because it is undesirable to have paraffin precipitates clogging up fuel system components, fuel systems are often designed with a means to circulate warm fuel through the system as soon as possible after cold start. One method for dealing with this problem is the positioning of a temperature sensitive valve in the return line between the fuel injectors and the fuel tank. When the temperature of fuel flowing through the supply line is relatively low, the fuel is directed from the return line to the supply line to be recirculated through the fuel system to warm the relatively cold fuel. When the fuel temperature is relatively high, the fuel is directed back to the fuel tank. While these valves have performed adequately, there is still room for improvement.

For instance, a fuel transfer problem can occur when the fuel system is evacuated and the fuel lines become filled with cool gaseous vapors. If this occurs when the detected temperature in the supply line is relatively cold, the bypass valve will connect the fuel supply to the fuel return line, thus allowing the fuel pump to continue to circulate the vapors through the fuel system while preventing the pump from pulling fuel from the fuel tank to prime the system. In turn, the engine will be prevented from starting.

The present invention is directed to overcoming one or more of the problems as set forth above.

DISCLOSURE OF THE INVENTION

In one aspect of the present invention, a dual temperature actuated valve includes a valve housing that defines a passageway extending between an inlet and an outlet. At least one valve member is movably positioned in the passageway. Positioned adjacent the inlet is a first temperature sensor. A second temperature sensor is positioned adjacent the outlet. The valve member(s) opens the passageway when a first temperature sensed by the first temperature sensor is greater than a first predetermined temperature and a second temperature sensed by the second temperature sensor is less than a second predetermined temperature. The valve member(s) closes the passageway when at least one of the first temperature is less than the first predetermined temperature and the second temperature is greater than the second predetermined temperature.

In another aspect of the present invention, a fuel system includes a fuel tank and at least one fuel injector. A supply line extends between an outlet of the fuel tank and an inlet of the fuel injector(s). A return line extends between an outlet of the fuel injector(s) and an inlet of the fuel tank. A bypass passageway extends between the supply line and the return line. Positioned in the bypass passageway is a valve. The valve is movable toward an open position when fluid in the return line is relatively warm and fluid in the supply line is relatively cold. The valve is movable toward a closed position when at least one of fluid in the return line is relatively cold and fluid in the supply line is relatively warm.

In yet another aspect of the present invention, a method of controlling a bypass passageway includes providing a bypass valve that is positioned in a passageway between a first line and a second line. The passageway is opened when fluid in the second line is relatively warm and fluid in the first line is relatively cold. The passageway is closed when at least one of fluid in the second line is relatively cold and fluid in the first line is relatively warm.

BEST MODE FOR CARRYING OUT THE INVENTION

Figure 1:
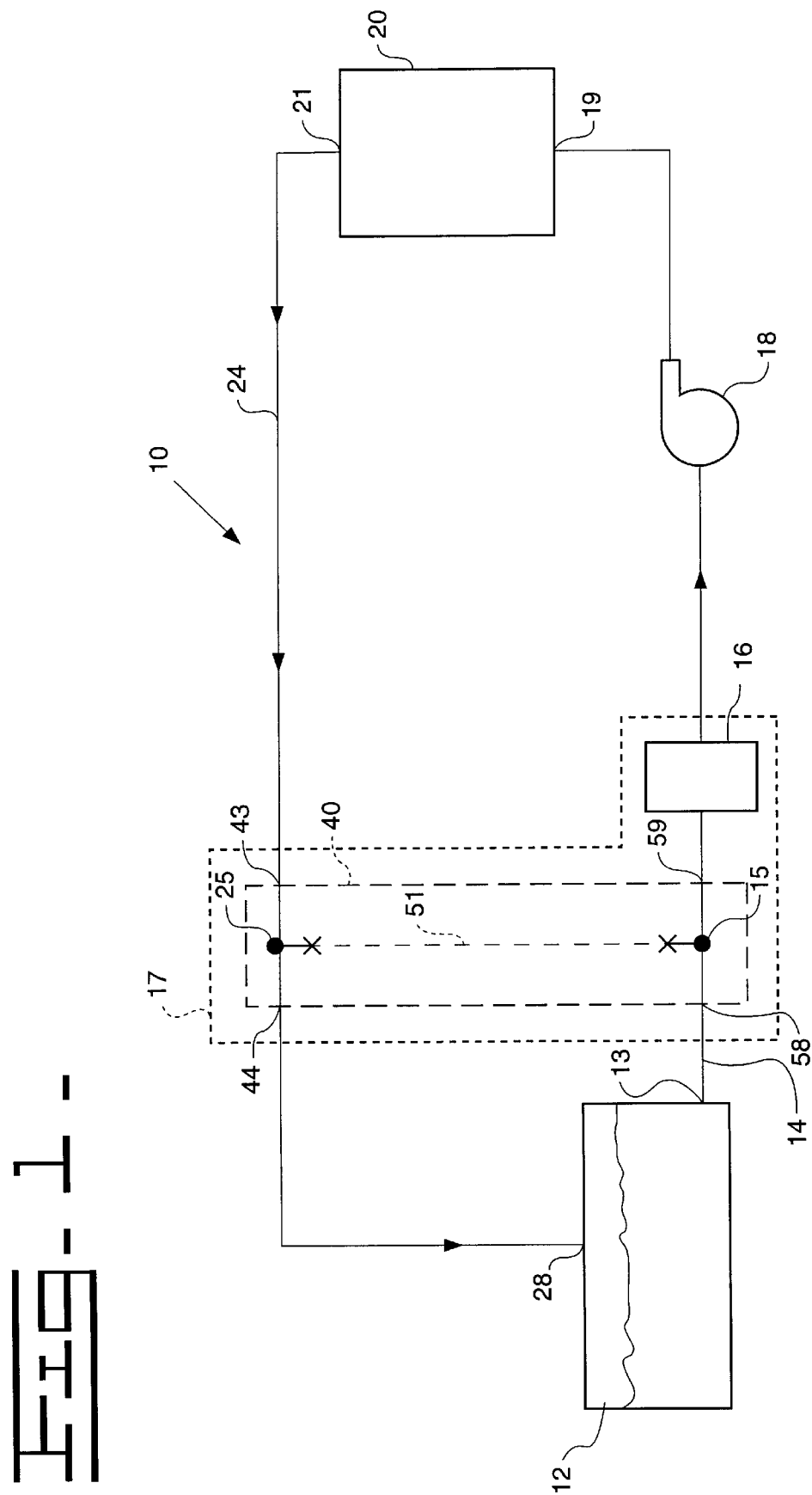
FIG. 1 is a schematic representation of a fuel system according to the present invention.

Referring to FIG. 1, there is shown a schematic representation of a fuel system 10 according to the present invention. A fuel tank 12 is provided in fuel system 10 that has an outlet 13 in fluid communication with a fuel supply line 14. Fuel tank 12 also has an inlet 28 that is in fluid communication with a fuel return line 24. A fuel filter 16 is positioned in supply line 14 and acts to trap precipitates and other solids from fuel flowing through supply line 14. Also positioned in supply line 14 is a fuel pump 18 that draws fuel out of fuel tank 12 to circulate fuel to at least one fuel injector 20 provided within fuel system 10. Fuel injector 20 has a fuel inlet 19 in fluid communication with supply line 14 and a fuel outlet 21 in fluid communication with return line 24. A valve filter assembly 17 is provided in fuel system 10, and provides a supply temperature sensor 15 that is positioned in supply line 14. Supply temperature sensor 15 is capable of sensing the temperature of fluid, such as liquid fuel and/or gaseous vapor, in the same. A return temperature sensor 25 is also provided in valve filter assembly 17 and positioned in return line 24 and is capable of sensing the temperature of fluid in the same. Extending between supply line 14 and return line 24 is a bypass passageway 51.

Figure 2:
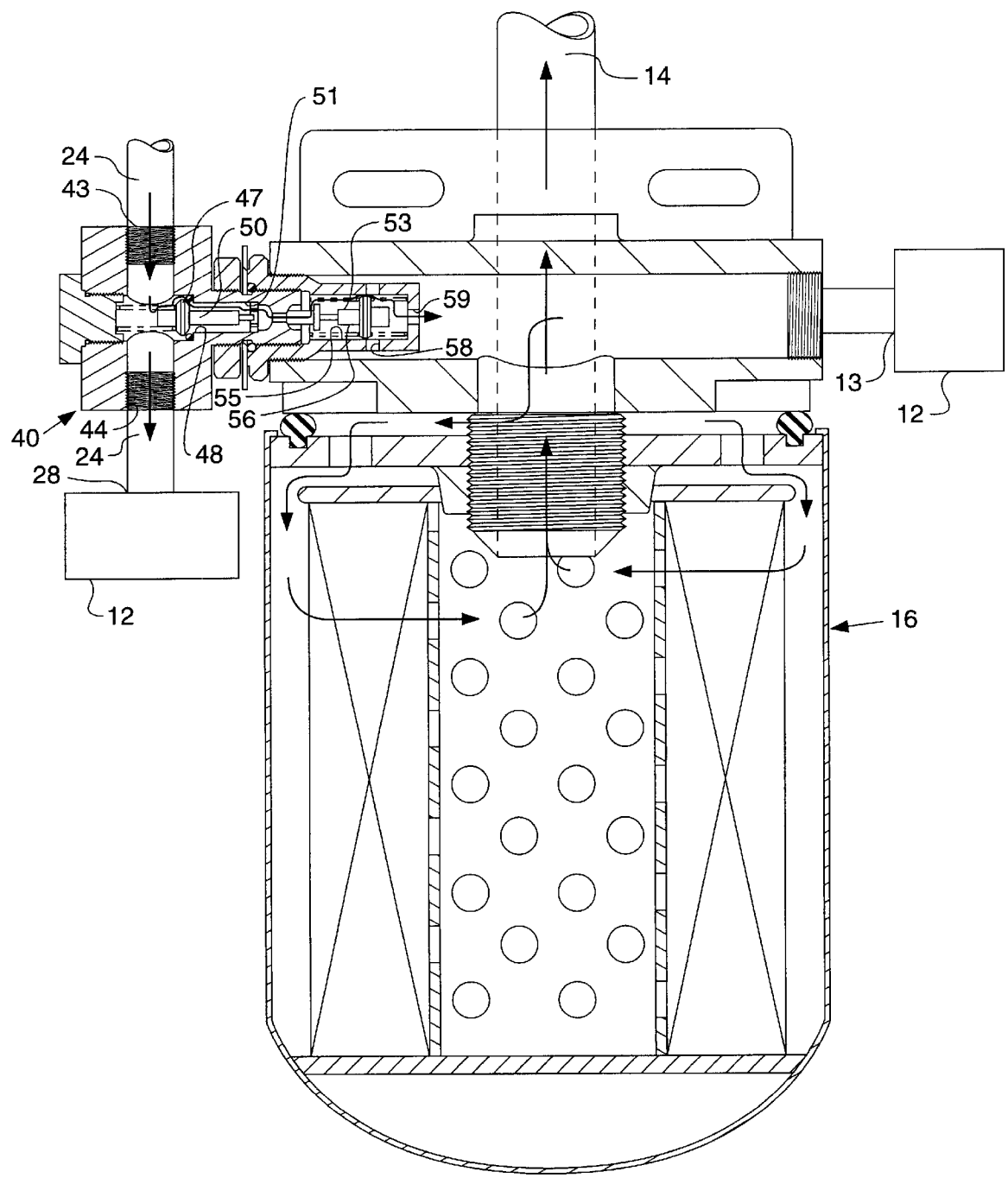
FIG. 2 is a diagrammatic representation of a fuel filter and bypass valve according to the present invention for use with the fuel system of FIG. 1.
Figure 3:
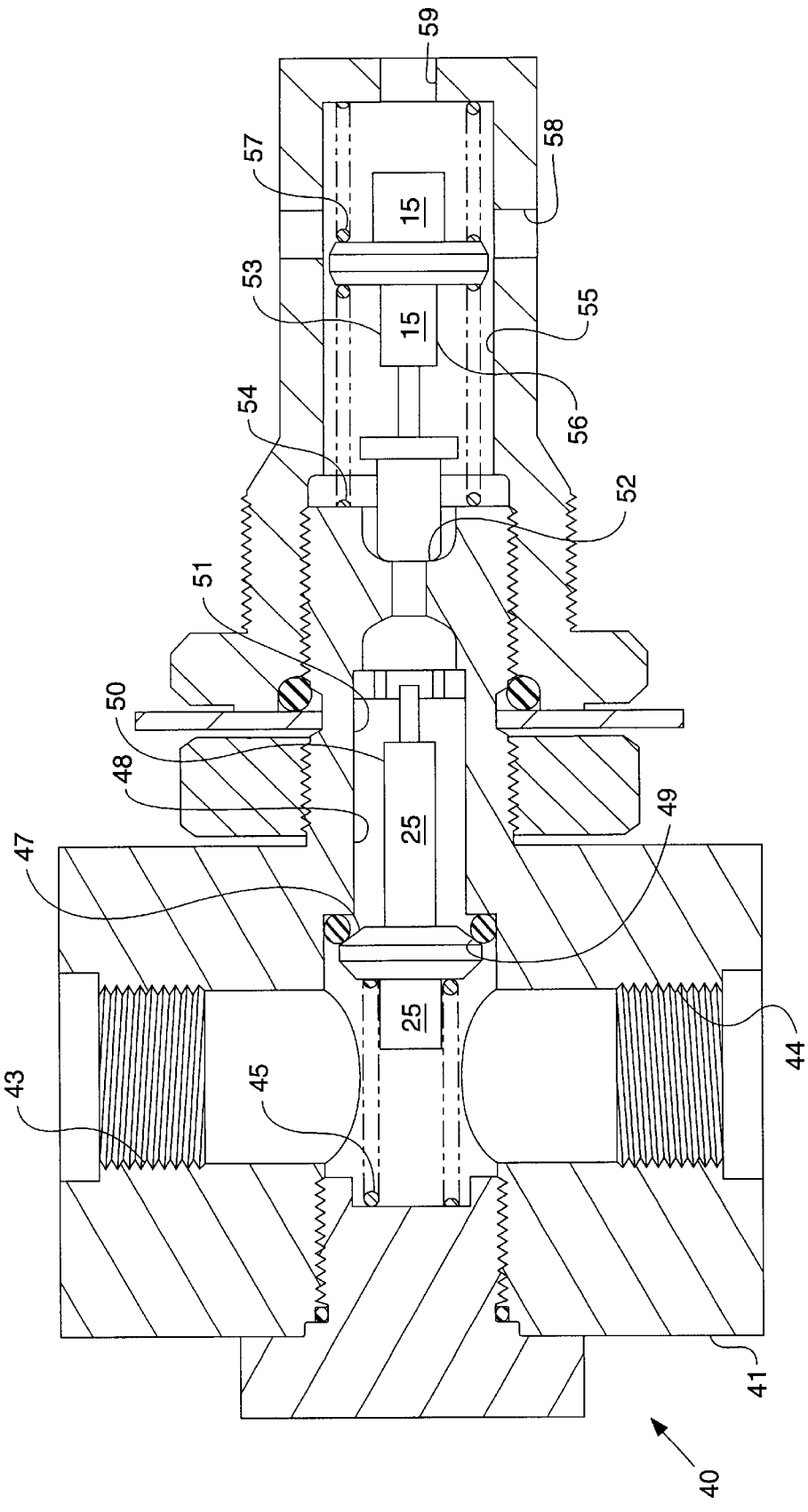
FIG. 3 is a diagrammatic representation of the bypass valve of FIG. 2.

Referring to FIGS. 2 and 3, valve filter assembly 17 is shown in greater detail. A bypass valve 40 having a valve housing 41 is mounted on fuel filter 16. Valve housing 41 defines a return inlet 43 that is in fluid communication with return line 24. Return inlet 43 is capable of fluid communication with a supply outlet 59, defined by valve housing 41, when bypass passageway 51 is open. Return inlet 43 is in continuous fluid communication with a return outlet 44, defined by valve housing 41. Therefore, some or all of fuel flowing into return inlet 43 from return line 24 will be directed to fuel tank 12 via return outlet 44 regardless of when bypass passageway 51 is open or closed respectively. Valve housing 41 also defines a supply inlet 58 that is in fluid communication with supply line 14. Fuel entering bypass valve 40 through supply inlet 58 can flow out of supply outlet 59 and flow through fuel filter 16.

Returning to bypass valve 40, a first valve member 47 and a second valve member 53 are positioned in a first segment 48 and a second segment 55 of bypass passageway 51, respectively. First valve member 47 is movable between a closed position in contact with a valve seat 49, defined by bypass valve 40, and an open position out of contact with valve seat 49. First valve member 47 is biased toward its closed position by a biasing spring 45. When first valve member 47 is in its closed position, return inlet 43 is blocked from first segment 48, and all of the fuel entering return inlet 43 will be returned to fuel tank 12 via return outlet 44. When first valve member 47 is away from its closed position, return inlet 43 is open to first segment 48 and capable of fluid communication with both first segment 48 and return outlet 44.

Similarly, second valve member 53 is movable between a closed position in contact with a valve seat 52, defined by bypass valve 40, and an open position out of contact with valve seat 52. When second valve member 53 is in its closed position, first segment 48 is blocked from second segment 55, thus preventing any fuel in first segment 48 from flowing through second segment 55 and exiting bypass valve 40 via supply outlet 59. When second valve member 53 is away from its closed position, first segment 48 is open to second segment 55. It should be appreciated that bypass passageway 51 is not open unless both first valve member 47 and second valve member 53 are away from their respective closed positions. In other words, return inlet 43 is blocked from fluid communication with supply outlet 59 unless both first valve member 47 and second valve member 53 are away from their respective closed positions.

First valve member 47 and second valve member 53 are actuated in their movement by a first wax motor 50 and a second wax motor 56, respectively. Wax motors such as first wax motor 50 and second wax motor 56 are known in the art and include a collection of a substance, typically a particular type of wax, that will expand and contract in response to temperature. In other words, the term "wax motor" is intended to mean anything that changes shape in response to a change in temperature and is capable of functioning as both a temperature sensor and an actuator for a valve member. The temperature at which expansion and contraction occur can be varied depending upon the type and amount of temperature sensitive substance used in the wax motor. For instance, while one wax motor may be constructed to begin expanding at a temperature greater than 20° C., a different wax motor may be constructed such that expansion does not begin to occur until it is exposed to a temperature greater than 50° C. In addition, while the wax motor may begin expanding at a first temperature, it may not reach its fully expanded size until it is exposed to a substantially higher temperature. Therefore, a wax motor may begin expanding when exposed to a temperature greater than 20° C., but not reach its fully expanded size until it is exposed to a temperature greater than 40° C.

Returning to bypass valve 40, first wax motor 50 serves as both an actuator for first valve member 47 and return temperature sensor 25. Similarly, second wax motor 56 serves as both an actuator for second valve member 53 and as supply temperature sensor 15. As illustrated, second wax motor 56 is suspended in bypass valve 40 by biasing spring 54 and 57, which maintain second wax motor 56 in its desired position attached to second valve member 53, while allowing the same to expand and contract at the appropriate temperatures. While the present invention has been illustrated utilizing wax motors to actuate first valve member 47 and second valve member 55, it should be appreciated that other actuators could be substituted. For instance return temperature sensor 25 and supply temperature sensor 15 could be independent components that communicate fuel temperature to an electronic control module provided in fuel system 10. Temperature information relayed to the electronic control module could then be utilized for actuation of electronically controlled actuators coupled to first valve member 47 and second valve member 53.

First wax motor 50 does not begin expanding to move first valve member 47 toward its open position until the temperature of fluid in return line 24 is above a minimum return actuation temperature. In the embodiment illustrated herein, the minimum return actuation temperature is preferably at least 50° C. Therefore, when return temperature sensor 25 detects a fuel temperature in return line 24 that exceeds 50° C., wax motor 50 begins to expand to move first valve member 47 away from its closed position. Complete expansion of first wax motor 50 to move first valve member 47 to its fully open position preferably does not occur until return temperature sensor 25 senses a maximum return actuation temperature. In the illustrated embodiment, this maximum return actuation temperature is preferably about 70° C. Therefore, first wax motor 50 does not expand to its full size to move first valve member 47 to its fully open position until return temperature sensor 25 senses a fuel temperature above 70° C. It should be appreciated, however, that first segment 48 will be fluidly connected to return inlet 43 so long as first valve member 47 is away from its closed position. However, flow area past valve seat 49, and therefore the amount of fuel from return inlet 43 that can enter first segment 48 will be affected by the location of first valve member 47 between its closed and open positions.

In order for first segment 48 to be open to second segment 55, second valve member 53 must be away from its closed position. Second valve member 53 is in its closed position blocking first segment 48 from second segment 55 when second wax motor 56 is fully expanded, and moves toward its open position when second wax motor 56 begins to contract. Second wax motor 56 begins to contract when the temperature of fuel in supply line 14 falls below a maximum supply actuation temperature. As illustrated herein, the maximum supply actuation temperature is preferably about 10° C. Thus, when supply temperature sensor 15 detects a fuel temperature in supply line 14 that is below 10° C., second wax motor 56 begins to contract to allow second valve member 53 to move away from its closed position. Second wax motor 56 preferably does not contract sufficiently for second valve member 53 to be moved to its fully open position until the temperature of fuel in supply line 14 falls to a minimum supply actuation temperature. As illustrated herein, this minimum supply actuation temperature is preferably substantially less than the maximum supply actuation temperature, and is on the order of −10° C. Thus, second valve member 53 will be moved to its fully open position only after supply temperature sensor 15 detects a fuel temperature that is around −10° C. Therefore, for the embodiment of the present invention disclosed herein, bypass passageway 51 will be open to allow warm fuel from return line 24 to mix with cool fuel from supply inlet 58 when return temperature sensor 25 detects a fuel temperature above 50° C. and supply temperature sensor 15 detects a fuel temperature below 10° C.

While values for the minimum return actuation temperature, the maximum return actuation temperature, the maximum supply actuation temperature and the minimum supply actuation temperature have been provided, it should be appreciated that these values have been provided for illustrative purposes only. The present invention contemplates selecting these temperatures to be any values which allow bypass valve 40 to perform its desired function of reducing the risk fuel filter 16 becoming clogged with paraffin precipitates. However, it is preferable that the difference between the minimum return actuation temperature and the maximum supply actuation temperature is at least 20° C. Factors to consider when selecting these temperature values include the cloud point of fuel to be used in fuel system 10 and the geographic region in which fuel system 10 is contemplated for use will influence the values of these temperatures. For instance, if fuel system 10 is to be used predominately in a warm climate, with fuel having a relatively high cloud point, the temperatures at which first wax motor 50 and second wax motor 56 expand and contract to open bypass passageway 51 should be higher than if fuel system 10 was to be used predominately in a cold climate, with fuel having a relatively low cloud point. Further, these temperatures should be selected such that an unduly high amount of precipitates are not permitted to clog fuel filter 16 before temperatures in the system rise enough to melt paraffins in the filter.

INDUSTRIAL APPLICABILITY

Referring to FIGS. 1–3, just prior to activation of fuel system 10 under cold start conditions, first valve member 47 is positioned in its biased, closed position such that return line 24 is blocked from bypass passageway 51. Second valve member 53 is in its open position, such that first segment 48 is open to second segment 55. Activation of fuel system 10 is followed by activation of fuel pump 18 which begins to draw fuel from supply line 14 for use in fuel system 10. Because bypass passageway 51 is closed, fuel pump 18 is only drawing fuel from fuel tank 12. In addition, fuel flowing into bypass valve 40 from return line 24 is prevented from flowing through bypass passageway 51, and instead is returned to fuel tank 12 via return outlet 44.

As operation of fuel system 10 continues, the temperature of fuel in return line 24 increases as a result of circulation near the warming engine cylinders. In addition, because all of the fuel from return line 24 is being directed toward fuel tank 12 while bypass passageway 51 remains closed, the temperature of fuel in supply line 14 is also increasing, although at a slower rate. When the fuel temperature in return line 24 exceeds the minimum return actuation temperature, first wax motor 50 begins to expand to move first valve member 47 toward its open position. As first valve member 47 moves away from valve seat 49, a portion of the fuel flowing into bypass valve 40 via return inlet 43 can flow into first segment 48 of bypass passageway 51.

Recall that under cold start conditions, second valve member 53 will be in its open position when fuel system 10 is activated. If the fuel temperature in supply line 14 detected by supply temperature sensor 15 remains below the minimum supply actuation temperature, second valve member 53 will remain away from its closed position and relatively warm fuel from return line 24 will be permitted to flow through bypass passageway 51 to mix with relatively cold fuel from supply line 14 and exit bypass valve 40 via supply outlet 59. Because warmer fuel is now flowing through fuel filter 16, there is less risk that fuel filter 16 will become clogged with paraffin precipitates before the entire system warms up. As fuel system 10 continues to operate, fuel temperature within return line 24 will continue to increase, thus allowing first valve member 47 to continue moving toward its fully open position, maximizing the flow area past valve seat 49. In addition, fuel temperature within fuel tank 12 will continue to increase as a portion of the warm fuel in return line 24 is continually returned to fuel tank 12 via return outlet 44. As the fuel temperature in supply line 14 increases, second wax motor 56 continues to expand to move second valve member 53 toward its closed position. Once the fuel temperature in supply line 14 exceeds the maximum supply actuation temperature, second wax motor 56 will fully expand to move second valve member 53 to its closed position to block first segment 48 from second segment 55.

It should be appreciated that bypass passageway 51 will remain closed for the duration of the operation of fuel system 10 so long as the fuel temperature in supply line 14 remains above the predetermined maximum supply temperature. Further, if the temperature of fuel in return line 24 should fall below the predetermined return temperature, it should be appreciated that first valve member 47 will be returned to its closed position, thus preventing fluid communication between return inlet 43 and first segment 48. In addition, if fuel system 10 is deactivated and then reactivated before fuel in fuel tank 12 has cooled sufficiently, second valve member 53 will remain in the closed position at fuel system activation.

The present invention can improve engine performance over bypass valves previously installed in fuel systems. Because bypass valve 40 includes a supply inlet 58 that is always open to supply outlet 59, fuel pump 18 will be capable of drawing fuel from fuel tank 12 even upon a cold start after the fuel system was evacuated of fuel. Recall that with previous bypass valves, if the engine was started under cold start conditions after it had been evacuated of fuel, the valve would continue to circulate gaseous vapors through the fuel system instead of pulling fuel from the fuel tank.

It should be appreciated that a number of modifications could be made to bypass valve 40 without departing from the scope of the present invention. For instance, while the bypass valve of the present invention has been illustrated utilizing two separate valve members, it should be appreciated that a single valve member having the ability to open the bypass passageway only when temperature in the return line is above a specified temperature and temperature in the supply line is below a specified temperature could instead be substituted. Further, while the valve members of the present invention have been illustrated as being actuated by wax motors, it should be appreciated that any suitable actuation means could be substituted. For instance, supply temperature sensor 15 and return temperature sensor 25 could be operably connected to an electronic control module included in fuel system 10. The electronic control module could then communicate a control signal to an electronic or digital actuator operably connected to the valve members to open or close the same. Further, while bypass valve 40 has been illustrated as being mounted on fuel filter 16, it should be appreciated that it could be attached to fuel filter 16 in any conventional manner, or alternatively could be located at some other suitable position within fuel system 10.

In addition to the above indicated modifications, it should be appreciated that the minimum return actuation temperature, maximum return actuation temperature, minimum supply actuation temperature and maximum supply actuation temperature are not intended to be limited to the values indicated herein, which were intended for illustrative purposes only. Recall that factors such as geographic region in which the bypass valve will be used and cloud point of the fuel to be used will influence selection of these values. In addition, these temperatures should be selected such that fuel filter 16 does not become unduly clogged with paraffin precipitates prior to the bypass passageway being opened. Further, while the present invention has been illustrated for use in a fuel system, it should be appreciated that it could find use in any fluid system having a first fluid line including a relatively high temperature fluid and a second fluid line including a relatively low temperature fluid, wherein heating of the relatively low temperature fluid is desirable under certain conditions.

Thus, those skilled in the art will appreciate that other aspects, objects and advantages of this invention can be obtained from a study of the drawings, the disclosure and the appended claims.

What is claimed is:

1. A dual temperature actuated valve comprising:
   a valve housing defining a passageway extending between an inlet and a first outlet, and including a second outlet in fluid communication with said inlet;
   at least one valve member being movably positioned in said passageway;
   a first temperature sensor being positioned adjacent said inlet;
   a second temperature sensor being positioned adjacent said first outlet;
   said at least one valve member opening said passageway when a first temperature sensed by said first temperature sensor is greater than a first predetermined temperature and a second temperature sensed by said second temperature sensor is less than a second predetermined temperature; and
   said at least one valve member closing said passageway when at least one of said first temperature is less than said first predetermined temperature and said second temperature is greater than said second predetermined temperature.

2. The dual temperature actuated valve of claim 1 wherein said at least one valve member includes a first valve member movable between an open position and a closed position and a second valve member movable between an open position and a closed position; and
   said passageway being at least partially open when said first valve member is away from said closed position and said second valve member is away from said closed position.

3. The dual temperature actuated valve of claim 1 wherein said passageway includes a first segment and a second segment;
   said first segment is open when said first temperature is greater than said first predetermined temperature; and
   said second segment is open when said second temperature is less than said second predetermined temperature.

4. The dual temperature actuated valve of claim 3 wherein said passageway is open when said first segment and said second segment are open; and
   said passageway is closed when at least one of said first segment is closed and said second segment is closed.

5. The dual temperature actuated valve of claim 1 wherein said inlet is a first inlet and said valve housing defines a second inlet in fluid communication with said outlet.

6. The dual temperature actuated valve of claim 1 wherein said first temperature sensor is a portion of a first wax motor and said second temperature sensor is a portion of a second wax motor; and
   said first wax motor and said second wax motor are operably coupled to said at least one valve member.

7. A method of controlling a bypass passageway comprising:
   providing a bypass valve connecting a first line and a second line via a passageway extending between an inlet and a first outlet;
   providing a fluid connection between said inlet and a second outlet of said bypass valve;
   sensing a first temperature adjacent to said inlet of said bypass valve with a first temperature sensor;
   sensing a second temperature adjacent to said first outlet of said bypass valve with a second temperature sensor;
   opening said passageway when fluid in said second line is relatively warm and fluid in said first line is relatively cold at least in part by moving at least one valve member of the bypass valve to an open position if said first temperature is greater than a first predetermined temperature and said second temperature is below a second predetermined temperature; and
   closing said passageway when at least one of fluid in said second line is relatively cold and fluid in said first line is relatively warm at least in part by moving the at least one valve member of the bypass valve to a closed position if at least one said first temperature is less than said first predetermined temperature and said second temperature is greater than said second predetermined temperature.

8. The method of claim 7 wherein said step of opening said passageway includes moving said valve toward an open position; and
   said step of closing said passageway includes moving said valve toward a closed position.

9. The method of claim 7 wherein said bypass valve includes a first valve member and a second valve member;
   said step of opening said passageway includes moving said first valve member away from a closed position and moving said second valve member away from a closed position; and
   said step of closing said passageway includes at least one of moving said first valve member toward a closed position and moving said second valve member toward a closed position.

10. The method of claim 7 including mixing fluid in said first line with fluid in said passageway.

11. The method of claim 7 including maintaining fluid communication between said first line and said second line when said bypass valve is in said closed position and away from said closed position.

12. The method of claim 8 wherein said bypass valve includes a first valve member and a second valve member; and
   operably coupling a first wax motor to said first valve member and a second wax motor to said second valve member.

13. A dual temperature actuated valve comprising:
   a valve housing defining a passageway extending between an inlet and an outlet;
   at least one valve member being movably positioned in said passageway;
   a first temperature sensor being positioned adjacent said inlet;
   a second temperature sensor being positioned adjacent said outlet;
   one of said at least one valve member being suspended in said valve housing by a pair of springs;
   said at least one valve member opening said passageway when a first temperature sensed by said first temperature sensor is greater than a first predetermined temperature and a second temperature sensed by said second temperature sensor is less than a second predetermined temperature; and said at least one valve member closing said passageway when at least one of said first temperature is less than said first predetermined temperature and said second temperature is greater than said second predetermined temperature.

14. The dual temperature actuated valve of claim 13 wherein said passageway includes a first segment and a second segment;

said first segment is open when said first temperature is greater than said first predetermined temperature; and said second segment is open when said second temperature is less than said second predetermined temperature.

15. The dual temperature actuated valve of claim 14 wherein said passageway is open when said first segment and said second segment are open; and said passageway is closed when at least one of said first segment is closed and said second segment is closed.

16. The dual temperature actuated valve of claim 13 wherein said inlet is a first inlet and said valve housing defines a second inlet in fluid communication with said outlet.

17. The dual temperature actuated valve of claim 13 wherein said outlet is a first outlet and said valve housing defines a second outlet in fluid communication with said inlet.

18. The dual temperature actuated valve of claim 13 wherein said first temperature sensor is a portion of a first wax motor and said second temperature sensor is a portion of a second wax motor; and said first wax motor and said second wax motor are operably coupled to said at least one valve member.

* * * * *